US011168796B2

(12) United States Patent
Meyer

(10) Patent No.: US 11,168,796 B2
(45) Date of Patent: Nov. 9, 2021

(54) SANITARY SWITCHABLE VALVE THAT CAN BE REMOTELY OPERATED AND ASSOCIATED SANITARY ASSEMBLY

(71) Applicant: Neoperl GmbH, Mullheim (DE)

(72) Inventor: Burkhard Meyer, Emmendingen (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 16/982,138

(22) PCT Filed: Mar. 7, 2019

(86) PCT No.: PCT/EP2019/055671
§ 371 (c)(1),
(2) Date: Sep. 18, 2020

(87) PCT Pub. No.: WO2019/211028
PCT Pub. Date: Nov. 7, 2019

(65) Prior Publication Data
US 2021/0116040 A1 Apr. 22, 2021

(30) Foreign Application Priority Data
Apr. 30, 2018 (DE) .......................... 202018102400.0

(51) Int. Cl.
G05D 11/00 (2006.01)
F16K 11/048 (2006.01)
E03C 1/02 (2006.01)
E03C 1/04 (2006.01)

(52) U.S. Cl.
CPC ............ *F16K 11/048* (2013.01); *E03C 1/021* (2013.01); *E03C 1/0408* (2013.01); *E03C 2201/30* (2013.01)

(58) Field of Classification Search
CPC ............... F16K 11/048; E03C 2201/30; Y10T 137/2683
See application file for complete search history.

(56) References Cited

U.S. PATENT DOCUMENTS 5,472,010 A 12/1995 Gonzalez
5,743,286 A 4/1998 Ko
5,778,921 A 7/1998 Ko
(Continued)

FOREIGN PATENT DOCUMENTS

DE 69408058 5/1998
DE 102015002885 9/2016
EP 1253361 10/2002

*Primary Examiner* — Reinaldo Sanchez-Medina
(74) *Attorney, Agent, or Firm* — Volpe Koenig

(57) ABSTRACT

To improve the switching characteristics of a sanitary switchover valve (1) it is suggested that a valve piston (6) of the switchover valve (1) is designed in such a way that a fluid which flows in through a valve inlet (3) of the switchover valve (1) into a valve body (2) of the switchover valve (1), both in a first switching position (7) and in a second switching position (8) can flow around a connecting element (12), which forms a middle section of the valve piston (6), on all sides. To this end, it is envisaged that an outer diameter (15) of the connecting element (12) is smaller than an outer diameter (17) of a second end section (14) of the valve piston (6), where the second end section (14) is arranged in the region of a second valve outlet (5) of the valve body 2.

16 Claims, 5 Drawing Sheets

(56) References Cited

U.S. PATENT DOCUMENTS

| | | | |
|---|---|---|---|
| 6,920,892 B2* | 7/2005 | Agresta | E03C 1/04 137/119.04 |
| 6,978,795 B2* | 12/2005 | Perrin | F16K 11/048 137/119.04 |
| 2005/0061386 A1 | 3/2005 | Lam | |
| 2010/0012197 A1* | 1/2010 | Liu | F16K 11/02 137/119.04 |
| 2012/0103436 A1 | 5/2012 | Ko | |
| 2012/0152387 A1 | 6/2012 | Chang et al. | |
| 2014/0054484 A1 | 2/2014 | Chang et al. | |

\* cited by examiner

US 11,168,796 B2

SANITARY SWITCHABLE VALVE THAT CAN BE REMOTELY OPERATED AND ASSOCIATED SANITARY ASSEMBLY

TECHNICAL FIELD

The invention relates to a sanitary switchover valve, which in particular can be operated remotely, as well as an associated sanitary assembly.

BACKGROUND

The switchover valve has a valve body that forms a valve inlet, a first valve outlet and a second valve outlet, as well as a valve piston that is movable from a first switching position into a second switching position. A fluid flowing in through the valve inlet can be guided along a first flow path through the first valve outlet. In the second switching position, in contrast, the fluid can be guided along a second flow path through the second valve outlet. By switching the switchover valve, a fluid, i.e. in particular a liquid, can therefore be guided either along the first flow path or along the second flow path, preferably through the valve body.

Switchover valves of this kind are known in the prior art, for example from DE 10 2015 002 885 A1. However, the use of such valves has shown that the switchover from the first switching position into the second switching position, particularly in the low pressure range, can be unreliable. A problem that typically occurs here is that the valve piston, during the switchover, particularly when there is only low fluid pressure, is caused to oscillate or rotate, which has a negative influence on the switching behavior. In particular, undesired noise may be produced or the switchover may be only incomplete.

From the publications EP 1 253 361 A1, US 2014 0054484 A1, U.S. Pat. No. 5,778,921, as well as U.S. Pat. No. 5,743,286 are additional switchable valves as described at the outset known, each of which can be moved between two switching positions by means of fluid pressure acting on valve pistons. Here, configurations are known in which the fluid flows past the valve piston or is guided through the valve piston (cf. EP 1 253 361 A1).

Finally, DE 10 20156 002 885 A1 discloses a further sanitary switchover valve by which fluid flows through piston inlets which are formed in side surfaces (with respect to the direction of movement of the valve piston) of the valve piston.

SUMMARY

Hence the objective of the present invention is to provide a switchover valve as described above, which overcomes these existing disadvantages and ensures reliable switchover behavior, particularly with low fluid pressures at the valve inlet.

To meet this objective, one or more of the features described herein are provided for a switchover valve. Thus in particular according to the invention to meet the objective with a switchover valve of the kind described above it is suggested that the valve piston should have a connecting element that connects a first end section of the valve piston in the region of the first valve outlet to a second end section of the valve piston in the region of the second valve outlet, where a preferably maximum outer diameter of the connecting element is smaller than a for example maximum, average or minimum outer diameter of the second end section.

According to the invention, the connecting element transmits tensile forces from the first end section to the second end section of the valve piston and vice versa. As a result, forces arising as a result of a fluid pressure on surfaces in the region of the respective end sections of the valve piston can be used to switch the switchover valve from the first into the second position (and vice versa).

Due to the specific geometry of the valve piston according to the invention, a particularly reliable switchover from the first switching position into the second switching position can be achieved, since compared to known switchover valves, a much greater volume of fluid can flow through the switchover valve during the switchover. Because of the accompanying greater momentum, larger forces can be generated by the flow of fluid, which can be used for the switchover. The fluid flowing through the valve inlet into the valve body flows along the connecting element, which forms part of the valve piston, either toward the first valve outlet or toward the second valve outlet, depending on which of the two flow paths is selected at the time.

According to the invention the objective can also be achieved by further advantageous designs according to the dependent claims.

According to a specific design, the valve piston can be switchable from the first switching position into the second switching position in particular by means of a fluid pressure present at the valve inlet. To this end, the valve piston is mounted, preferably translationally slidably, within the valve body, for example by means of a lip seal (cf. below).

The switchover can preferably take place as soon as the second flow path, in particular in a section adjoining the second valve outlet, is cleared. The clearing can for example take place by means of an outlet valve, arranged downstream in relation to the second valve outlet, which in particular can be arranged remotely from the switchover valve, and which is opened manually by a user. Thus it is possible to switch the switchover valve remotely, for example by operating an outlet valve as just described.

Preferably the first end section of the valve piston in the region of the first valve outlet forms a valve seal with the valve body. In this case the valve body can to this end form a ring-shaped sealing surface, as a result of which a particularly reliable sealing is achievable.

Preferably this valve seal, in the first switching position, is at least partially open. Then, in the first switching position, a fluid flowing in through the valve inlet can flow past the valve seal and out of the first valve outlet. As a result of this fluid flow, in particular forces are generatable that hold the valve piston in the first switching position and pull it into this position.

Independently of this, in the second switching position the first valve outlet is preferably completely closed.

The second end section of the valve piston, on the other hand, can form a receiving space into which a functional element can be or is inserted.

Preferably the functional element influences, for example regulates, a fluid flow along the second flow path. Thus the functional element can be for example a flow restrictor, a flow rate regulator or a non-return valve or a backflow preventer. These elements regulate the fluid flow through the functional element, depending on the fluid pressure present at the functional element.

To ensure the correct functioning of the functional element, in particular it can be envisaged that at least one elastic retaining piece is provided, which fixes the functional element in the receiving space. Here it is preferable if the at least one retaining piece is held in a position that fixes the functional element by a retaining ring. The retaining ring can be elastically formed, for example as an O-ring.

It is very particularly advantageous for a reliable switchover of the switchover valve if in addition the outer diameter of the connecting element is smaller than an outer diameter of the first end section. The outer diameter of the connecting element here can be for example a minimum, average or maximum outer diameter. Furthermore, the outer diameter of the first end section here can be a minimum, average or maximum outer diameter.

Additionally, or alternatively, it can also be envisaged that an inner diameter of the valve body at the level of the valve inlet is chosen to be at least 1.5 times, two times or even three times as large as the outer diameter of the connecting element.

All these variants can result in the fluid flow being favorable during the switchover of the switchover valve; in particular a greater volume of fluid can be used for the switchover and, as will be explained in more detail, particularly large impact surfaces can be formed on the valve piston, which is advantageous for a reliable switchover.

The connecting element can be for example of rod-shaped design, in particular such that the connecting element offers the least possible flow resistance.

Alternatively, or additionally, the connecting element can be designed as a piston shaft, preferably made of solid material. At least in some areas, the connecting element can alternatively or additionally be designed rotationally symmetrically. In addition, however, the connecting element can also be designed for example in the form of a straight tube. In all these cases it is generally advantageous for simple production if the connecting element is designed in one piece together with the valve piston. The connecting element can alternatively or in further regions have a non-circular, for example star-shaped, polygonal or oval cross-section.

Independently of this it is also advantageous for the smoothest possible fluid flow inside the valve body if the connecting element is arranged centrically in relation to the valve body and/or at a distance from an inner wall of the valve body.

To maximize the forces that can be used for the switchover, it is advantageous to design impact surfaces on the valve piston. If a fluid pressure is exerted on such a surface, the pressure transmits a force onto the valve piston which can be used to switch the valve.

Thus for example according to a specific design it can be provided that the valve piston at the level of a first transition region from the connecting element to the first end section forms a first impact surface. Additionally, or alternatively to this, the valve piston can also at the level of a second transition region from the connecting element to the second end section form a second impact surface.

Preferably the two impact surfaces in each case transition directly into the connecting element. In addition, it is advantageous if the two impact surfaces are designed rotationally symmetrically in relation to the connecting element.

It is particularly advantageous if in the second switching position the second impact surface maintains a distance from a or the inner wall of the valve body. For in this case, part of the fluid flow can be directed into a dead space, as will be explained in more detail.

Another advantageous design envisages that at least one flow opening, but preferably at least three flow openings is/are formed, through which the second flow path runs, in particular into a, for example the previously mentioned, receiving space. Preferably the flow opening(s) flow into the receiving space which accommodates the functional element.

In a preferred variant, the at least one flow opening is formed in the second impact surface.

In addition, it is preferable if the functional element is arranged in the direction of the second flow path behind the at least one flow opening, i.e. for example behind the second impact surface. In this way, the second flow path can be easily brought to the functional unit. Alternatively, or additionally, as a result it is easily achievable that the flow resistance of the functional unit contributes to an effective attack surface together with the second impact surface.

It can moreover also be envisaged that the flow openings are evenly distributed in the second impact surface. In this way, an even flow through the functional element can be ensured.

Independently of this, it is furthermore advantageous if the second impact surface or a second attack surface comprising the second impact surface is designed to be larger than, preferably more than 1.5 times, two times or even three times as large as the first impact surface or a first attack surface comprising the first impact surface. For as a result of such a design, a particularly reliable switchover from the first switching position into the second switching position can be achieved. For in this case, the forces generated by the fluid pressure in the direction of the second switching position are very much greater than those in the direction of the first switching position.

A fluid chamber can be designed between the valve body and the connecting element. This fluid chamber surrounds the connecting element preferably in a ring shape. Here the valve inlet can flow into the fluid chamber.

Additionally, or alternatively, the fluid chamber can be designed so that a fluid flowing through the valve inlet into the fluid chamber can flow around an outer surface of the connecting element, preferably on all sides. This results in a particularly favorable flow behavior of the fluid, with the result that for example in particular rotations of the valve piston are preventable.

According to a further possible design of the switchover valve, it is envisaged that the fluid chamber, starting from the valve inlet, becomes narrower in the direction of the first end section. Here it is preferable if the fluid chamber additionally becomes wider in the direction of the second end section.

As a result of such designs, in particular it can be achieved that a second flow cross-sectional area of the fluid chamber in the second transition region is larger than a first flow cross-sectional area of the fluid chamber in the region of the first end section. As a result of these features, the switchover behavior can be further optimized, as will be explained in more detail with the aid of the figures.

According to another design, the switchover behavior of the switchover valve can be improved in particular by designing a first attack surface of the valve piston, which attack surface generates surface forces when a fluid pressure is present at the valve inlet, which pull the valve piston toward the first switching position, to be smaller, preferably more than 1.5 times, two times or three times smaller than a second attack surface of the valve piston, which when a fluid pressure is present at the valve inlet generates surface forces which pull the valve piston toward the second switching position. The first attack surface can here comprise the already mentioned first impact surface, and/or the second attack surface can here comprise the already mentioned second impact surface and/or a further impact surface in particular as described below. In general, the attack surfaces can be characterized for example as the in each case hydraulically effective surfaces which bring about a pressure-induced displacement of the piston.

According to another design again, the switchover behavior can be optimized by forming a preferably rotationally symmetrical dead space between the valve body and the second end section of the valve body. While a fluid flowing in through the valve inlet can flow into this dead space, it cannot flow through it. This is advantageous because an additional impact surface can be created, which provides additional switching forces for the switchover from the first switching position into the second switching position. It is particularly advantageous here if the valve piston generates such an additional impact surface for the fluid, in particular by a seal encircled around the valve piston. The seal can for example be designed as a lip seal. The advantage of this is that a frictional resistance is low. Alternatively, the seal can also be designed as an O-ring, X-ring or as an annular groove of any cross-sectional shape.

The seal just described, in particular lip seal, can be used in particular to guide the valve piston. It may therefore be provided that the valve piston is guided by means of the lip seal in the valve body, preferably translationally. Here it is particularly advantageous if a sealing lip of the lip seal points toward the first valve outlet. For in this case the fluid pressure present can help to seal the valve piston, as the fluid pressure presses the sealing lip against an inner wall of the valve housing. To prevent damage to the sealing lip, it is at the same time preferable if for example the second impact surface of the valve body, but not the lip seal, limits the movement of the valve piston into the first switching position. The lip seal can also be fitted in the reverse orientation, for example to create a bypass for high pressures.

For a compact design of the switchover valve it is furthermore considered advantageous if the valve inlet is arranged between the first valve outlet and the second valve outlet. Additionally, or alternatively, it may also be envisaged that the valve inlet is formed in an outer lateral surface of the body at the level of the connecting element.

According to a further design, it is furthermore advantageous if a length of the connecting element, in particular in the direction of a switching movement of the valve piston is selected so that a fluid flowing in through the valve inlet can both in the first switching position and in the second switching position flow around the connecting element.

To achieve the objective according to the invention furthermore a sanitary assembly is provided with a first fluid outlet, a second fluid outlet and with a switchover valve, which can be designed as described earlier and/or in particular according to one of the claims directed at a switchover valve.

Preferably the valve body of the switchover valve is set in a housing of the sanitary group in such a way that the first flow path runs through the first fluid outlet, while the second flow path runs through the second fluid outlet of the assembly. In addition, it can additionally or alternatively be envisaged that at the second fluid outlet a manually operable outlet valve is provided, with which the second flow path can be cleared, with the result that the switchover valve switches over from the first switching position into the second switching position, provided that a fluid pressure is present at the valve inlet.

For example, one application of the invention may provide that the switchover valve in its usage position is arranged encapsulated inaccessibly from the outside in the sanitary assembly and/or is switchable by means of a pressure change in the second fluid outlet. Additional mechanical or electrical or other actuating means are therefore dispensable. This may reduce a constructive complexity and/or a production expense.

BRIEF DESCRIPTION OF THE DRAWINGS

The invention will now be described in more detail with the aid of example embodiments, but it is not limited to these example embodiments.

Further example embodiments result from the combination of features of individual or several claims with each other and/or with individual or several features of the respective example embodiment. In particular, therefore, embodiments of the invention can be obtained from the following description of a preferred example embodiment in conjunction with the general description, the claims and the drawings.

The figures show:

Figure 1:
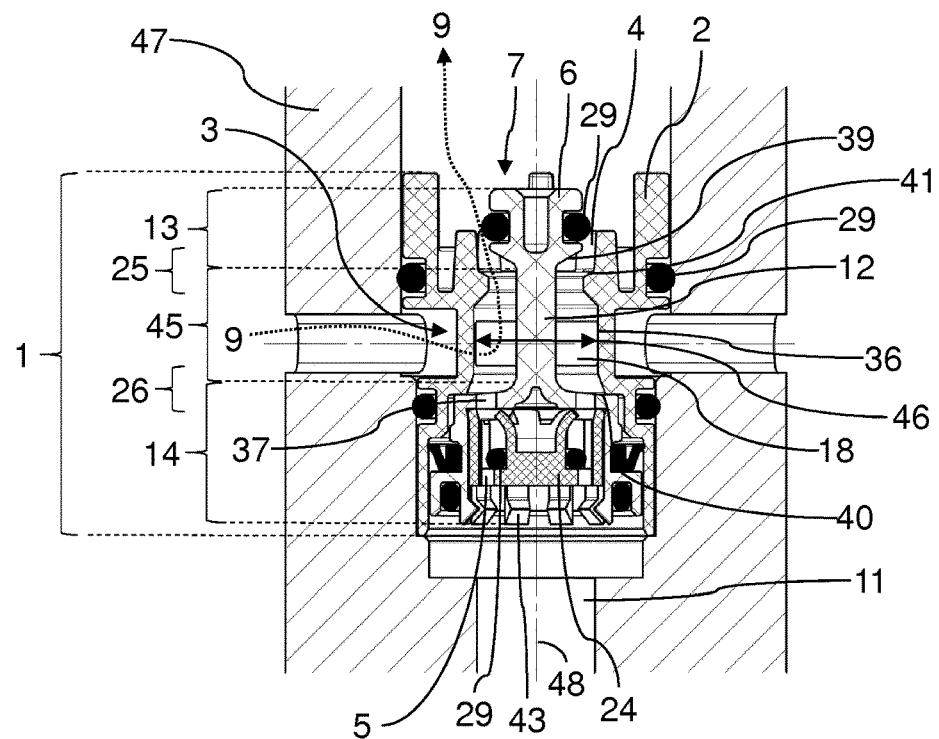
Figure 2:
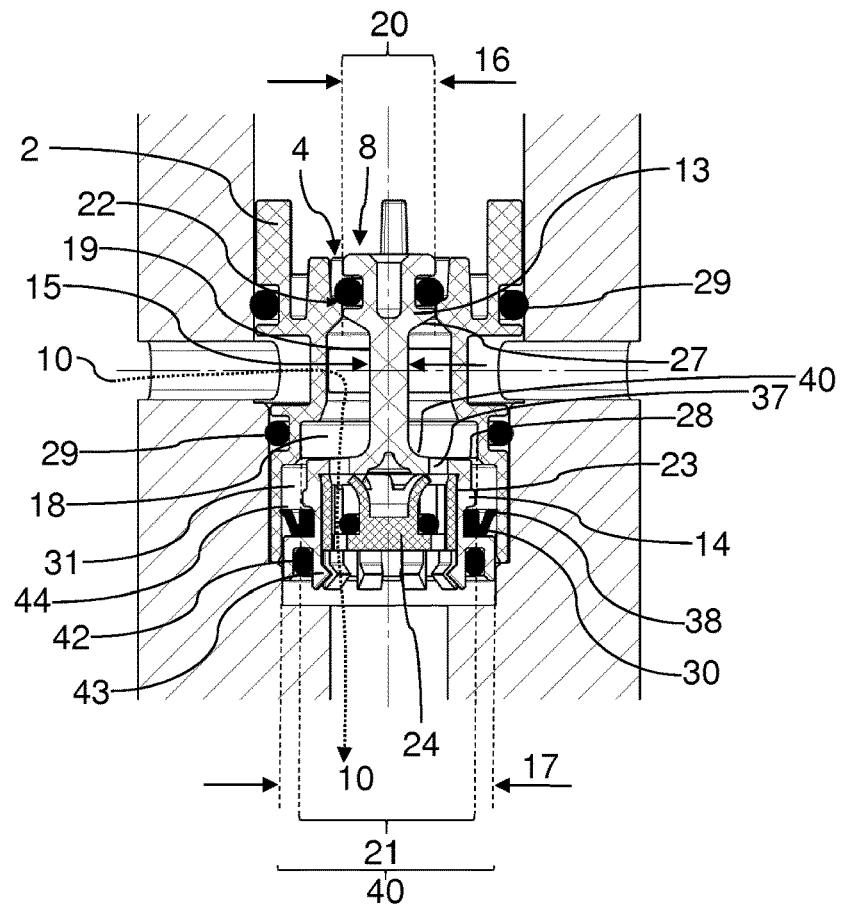
Figure 3:
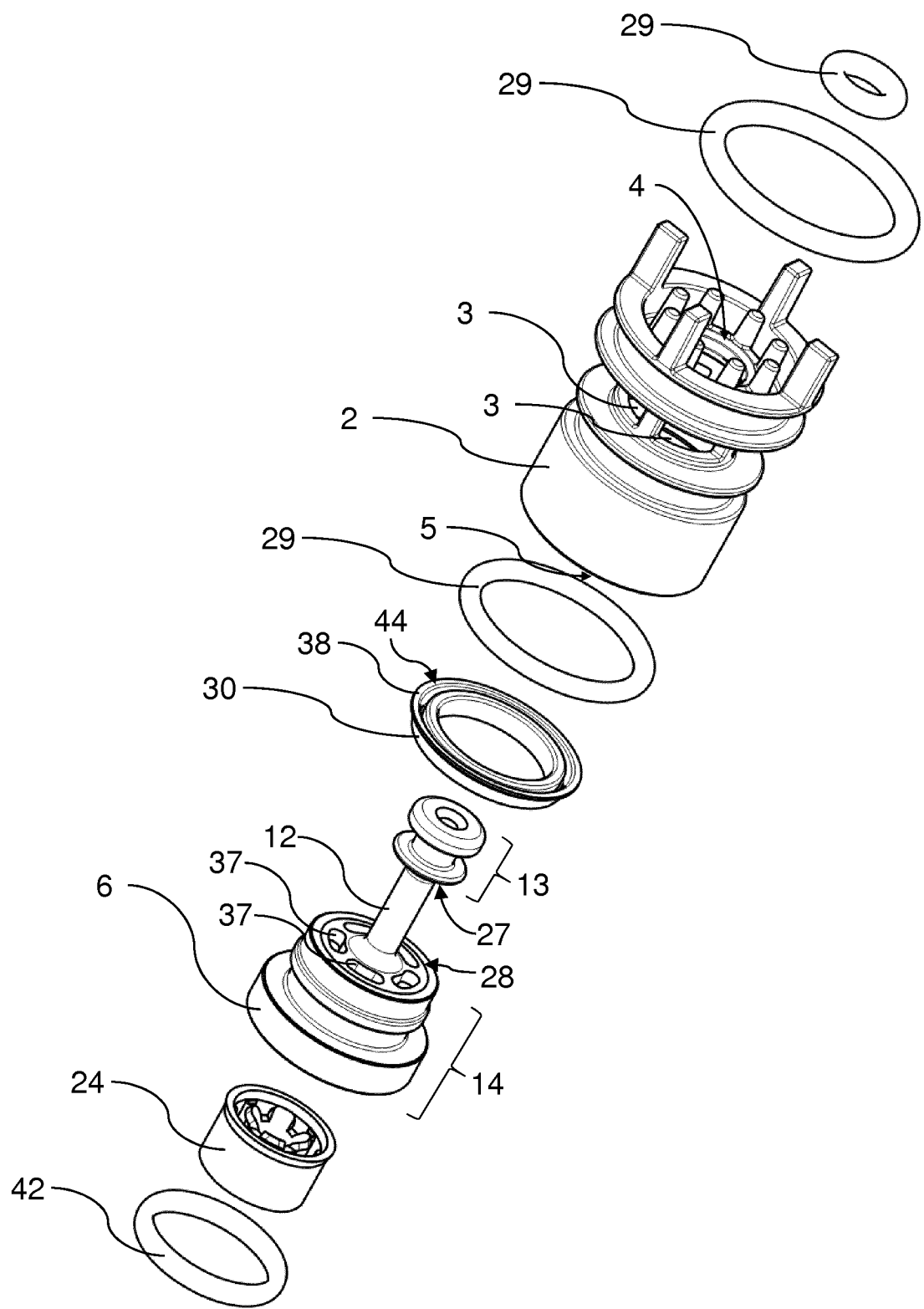
Figure 4:
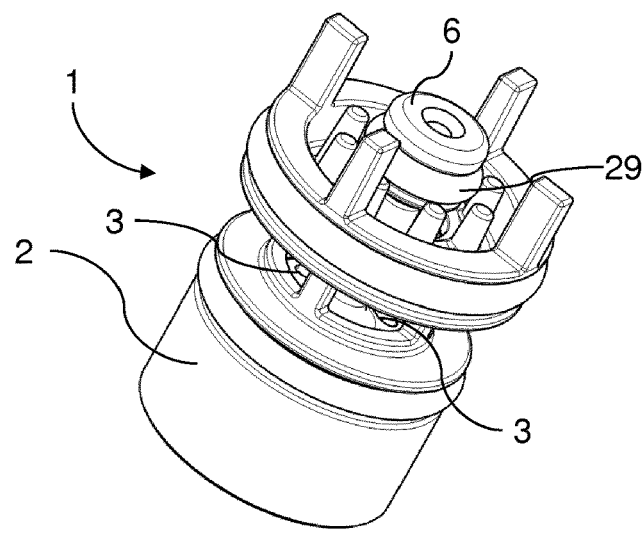
Figure 5:
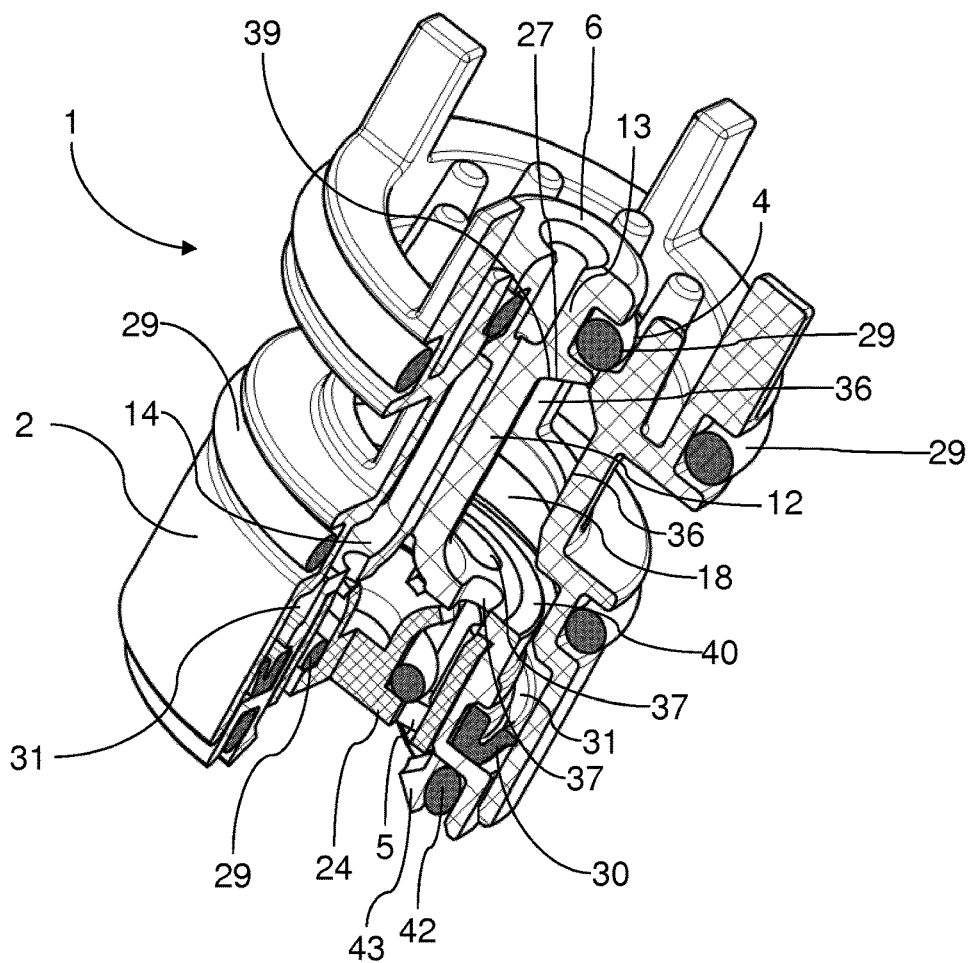
Figures 6, 7:
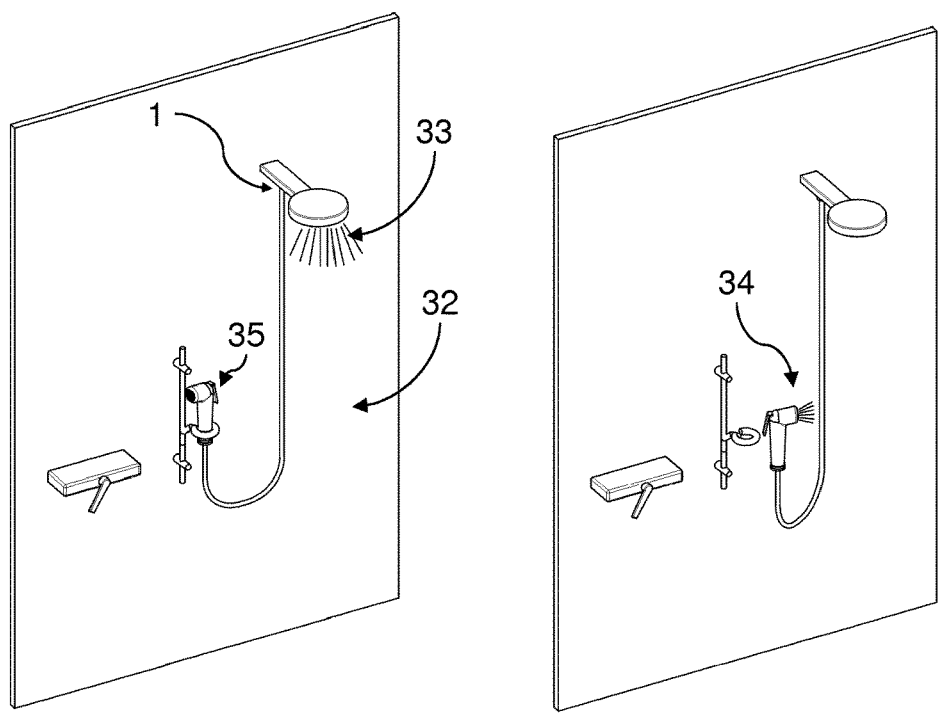
Figure 8:
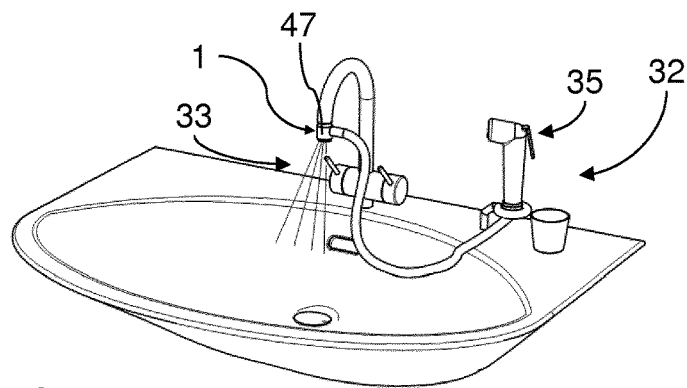
Figure 9:
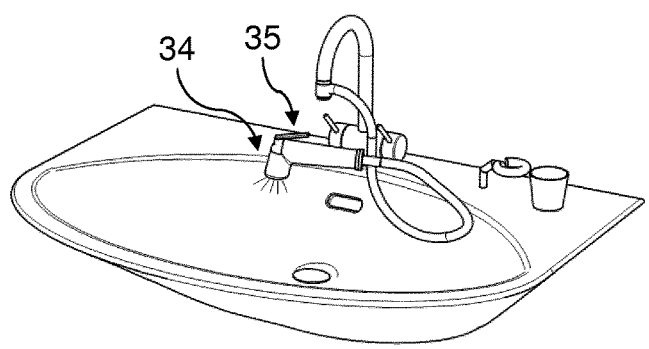
Figure 10:
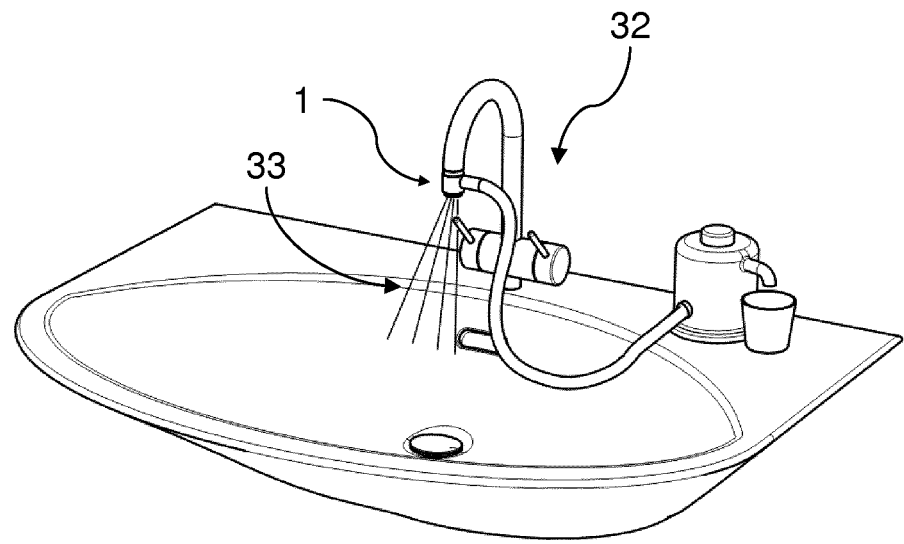
Figure 11:
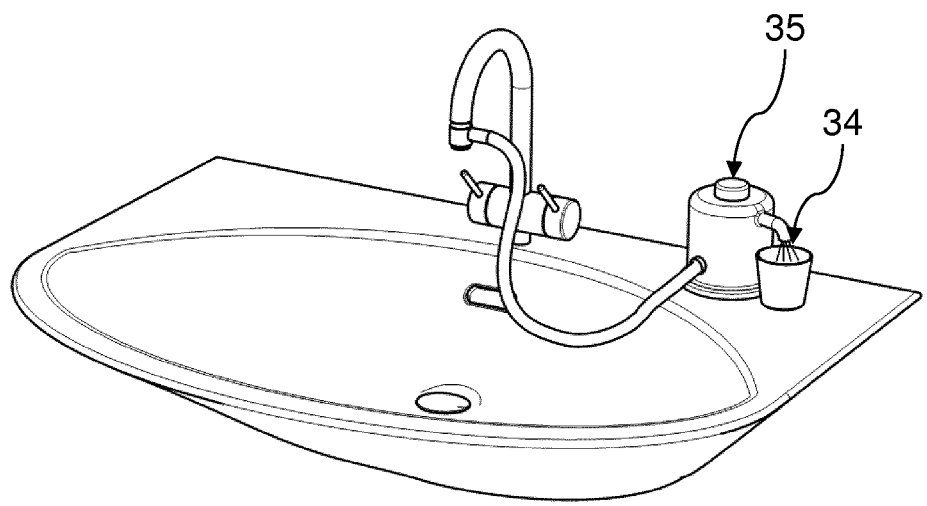

FIG. 1 a detailed cross-sectional view of a switchover valve according to the invention, which is set in a sanitary assembly, where the valve piston is located in the first switching position, FIG. 2 the switchover valve of FIG. 1, where the valve piston is located in the second switching position, FIG. 3 an exploded view of the switchover valve according to the invention of FIG. 1, FIG. 4 the switchover valve of FIG. 1 in an isometric view, FIG. 5 the switchover valve of FIG. 1 in an isometric view including a partial longitudinal section, FIG. 6 a first example of the use of a switchover valve according to the invention, which is in the first switching position, FIG. 7 the same application example of FIG. 6, where the switchover valve is now in the second switching position, FIG. 8 a second example of the use of a switchover valve according to the invention, which is in the first switching position, FIG. 9 the same application example of FIG. 8, where the switchover valve is now in the second switching position, FIG. 10 a further example of the use of a switchover valve according to the invention, which is in the first switching position, FIG. 11 the same application example of FIG. 10, where the switchover valve is now in the second switching position.

DETAILED DESCRIPTION

FIG. 1 shows a switchover valve 1 according to the invention in an installed position inside a housing 47 of a sanitary assembly 32. The switchover valve 1 comprises a valve piston 6, which can be moved in a translational movement from the first switching position 7 shown in FIG. 1 inside the valve body 2 into a second switching position 8.

In the first switching position 7 a fluid flowing through the valve inlet 3 formed in a lateral surface of the valve body 2 can flow along the first flow path 9 shown in FIG. 1 through the first valve outlet 4. In the second switching position 8 by contrast (cf. FIG. 2) in the example embodiment shown in FIGS. 1 and 2 the first valve outlet 4 is completely closed and the fluid follows the second flow path 10 shown in FIG. 2 through the second valve outlet 5.

The valve piston 6 has a first end section 13 in the region of which the first valve outlet 4 is designed and a second end section 14 in the area of which the second valve outlet 5 is designed.

The two end sections 13, 14 are connected to each other by means of a connecting element 12. Here an outer diameter 15 of the connecting element 12 is chosen such that this diameter is smaller than an outer diameter 17 of the second end section 14. As a result, large fluid volumes can act on the second end section 14 and therefore on the valve piston 6 during the switchover from the first switching position 7 into the second switching position 8, with the result that switching can be reliably ensured even with low fluid pressures.

The outer diameter 16 of the first end section 13 is chosen to be larger than the outer diameter 15 of the connecting element 12. This results in the recognizably dumbbell-shaped outer form of the valve piston 6 in FIGS. 1 and 2.

At the level of a first transition region 25 from the connecting element 12 to the first end section 13, the valve piston 6 forms a first impact surface 27, and at the level of a second transition region 26 from the connecting element 12 to the second end section 14 a second impact surface 28. These two impact surfaces 27, 28 each transition directly into the connecting element 12 and in each case are rotationally symmetrically designed in relation to the connecting element 12. As can be seen in FIG. 2, the second impact surface 28 in the second switching position 8 maintains a distance from the inner wall 36 of the valve body 2.

If a fluid pressure is present at the valve inlet 3 and if the second flow path 10 has just been blocked, for example because the section 11 shown in FIG. 1 of the second flow path 10 is not cleared, then the valve piston 6 is pulled into the first switching position 7 by forces arising as a result of the presence of the fluid pressure on the first impact surface 27 of the valve piston 6.

If now in the case of fluid pressure continuing to be present at the valve inlet 3 the second flow path 10 is cleared, the fluid can flow through the second valve outlet 5 of the valve body 2, as shown in FIG. 2 by means of the second flow path 10, which is represented as a dotted line. As a result of this second now possible fluid flow, additional forces are generated, which arise as a result of the presence of the fluid pressure on the second impact surface 28 of the valve piston 6. Thus, the valve piston 6 can be switched by means of a fluid pressure present at the valve inlet 3 from the first switching position 7 into the second switching position 8, as soon as the second flow path 10, in particular its section 11 (cf. FIG. 1), which follows on from the second valve outlet 5, is cleared.

In the example embodiment shown in FIG. 1 furthermore a sealing O-ring 29 is designed on the first end section 13, which acts together with a rotationally symmetrical sealing surface 41, which is formed by an inner wall 36 of the valve housing 2. As a result, the first end section 13 forms in the region of the first valve outlet 4 a valve seal 22 with the valve body 2, which can be closed and opened by translation of the valve piston 6.

As can clearly be seen in FIG. 2, the second end section 14 of the valve piston 6 by contrast forms a receiving space 23, into which a functional element 24 is inserted as a cartridge. The second flow path 10 runs through the functional element 24.

In the example embodiment shown in FIGS. 1 and 2, the functional element 24 is a flow rate regulator, which with the aid of an O-ring 29 (cf. FIG. 1) regulates to a particular value the fluid volume flowing through the second valve outlet 5, largely independently of the fluid pressure prevailing in the fluid chamber 18 (cf. below).

To reliably ensure this functionality, the functional element 24 is securely held in the receiving space 23 by means of several retaining pieces 43 (cf. FIG. 2). At the same time, a retaining ring 42 formed of elastomer presses the retaining pieces 43 concentrically inward, with the result that retaining lugs of the retaining pieces 43 surround the functional element 24 (cf. FIG. 5).

The individual components of the switchover valve 1 according to the invention can be seen in the exploded view of FIG. 3. In particular the switchover valve 1 is designed in such a way that it can be assembled by simply plugging all the components into one another.

In the exemplary embodiment shown in FIGS. 1 and 2, the connecting element 12 is designed in one piece with the valve piston 6 and as a piston shaft made of a solid material (cf. also FIG. 5). An outer surface 19 of the valve piston 6 is designed as a cylindrical lateral surface.

In addition, the valve body 2 is designed such that the connecting element 12 in both switching positions 7, 8 is always arranged at a distance from an inner wall 36 of the valve body 2. In other words, therefore, a fluid chamber 18 is formed between the valve piston 6 and the valve body 2, as shown in FIG. 5. Here a length 45 (cf. FIG. 1) of the connecting element 12 is chosen particularly so that in both switching positions 7 and 8 a fluid flowing in through the valve inlet 3 can flow around an outer surface 19 of the connecting element 12 on all sides.

Here the fluid chamber 18 surrounds the valve piston 6, more precisely the connecting element 12, in a ring shape. In addition, the fluid chamber 18 is designed rotationally symmetrically around a longitudinal axis 48 of the valve piston 6 (cf. FIG. 1). The valve piston 6 in turn is centrically arranged in relation to the valve body 2 (cf. FIG. 5).

As shown by the two dotted flow paths 9 and 10 in FIGS. 1 and 2, the valve inlet 3 flows into the fluid chamber 18, as FIGS. 3 and 4 together also illustrate.

At the level of the valve inlet 3 the fluid chamber 18 has an inner diameter 46 (cf. FIG. 1) which is chosen to be more than three times as large as the outer diameter 15 of the connecting element 12 (cf. also FIG. 5). In further example embodiments the inner diameter 46 is designed to be more than 1.5 times or two times as large as the outer diameter 15.

Starting from the valve inlet 8, the fluid chamber 18 becomes narrower toward the first end section 13 and widens toward the second end section 14, as can be clearly seen from the slopes of the inner wall 36 of the valve body 2 in FIG. 1. As a result, compared to previously known switchover valves a greater volume of fluid can flow through the switchover valve 1 as it switches into the second switching position 8, which is highly advantageous for robust switching behavior.

Furthermore the fluid chamber 18 is designed in such a way that a first flow cross-sectional area 20, which determines the fluid flow in the region of the first end section 13 of the valve piston 6 through the first valve outlet 4, is designed smaller than a second flow cross-sectional area 21, which in the region of the second end section 14 of the valve piston 6 determines the fluid flow toward the second attack surface 40 (in the example formed by the second impact surface 28 as well as the further impact surface 44—cf. below). Here in particular such fluid flows through the second flow cross-sectional area 21 as flows into a dead space 31, which surrounds the receiving space 23 rotationally symmetrically (cf. FIG. 2). From the figures it can furthermore be seen that the first impact surface 27 forms the first attack surface 39.

In further exemplary embodiments the first impact surface 27 can coincide with the first attack surface 39 and/or the second impact surface 28 can coincide with the second attack surface 40 and/or the first impact surface 27 can be contained in the first attack surface 39.

As can be clearly seen with the help of FIG. 2, the fluid volume that during the switchover flows into the (variable) dead space 31 does not flow through the second valve outlet 5. The purpose of the dead space 31, which changes with the position of the valve piston 6, is rather to generate additional switching forces, which arise on a further impact surface 44, in order to improve the switchover of the valve piston 6 into the second switching position 8. For the same reason, the second impact surface 28 is designed for example more than three times as large as the first impact surface 27. In further example embodiments the second impact surface 28 is designed more than 1.5 times or more than two times as large as the first impact surface 27.

So that the fluid can flow from the fluid chamber 18 into the functional element 24, which is arranged along the second flow path 10 behind the second impact surface 28, five kidney-shaped flow openings 37 are designed in the second impact surface 28 (cf. FIG. 3), which are arranged equally along a circumference of the second end section 14 of the valve piston 6.

As can also be clearly seen in FIG. 1, the length 45 of the middle section of the valve piston 6, which forms the connecting element 12, is chosen particularly so that in both switching positions 7, 8 it is ensured that a fluid flowing in through the valve inlet 3 can flow along the first flow path 9 and along the second flow path 10 in each case around the connecting element 12 on all sides. As a result, the fluid can flow almost unimpeded onto the first attack surface 39 and respectively the second attack surface 40 in order to generate the necessary switching forces for the respective switching of the valve piston 6.

In the exemplary embodiment shown in FIGS. 1 and 2, the valve inlet 3 is arranged between the first valve outlet 4 and the second valve outlet 5, therefore flows into the fluid chamber 18 and is formed by several flow openings in an outer lateral surface of the valve body 2, as can be clearly seen in FIG. 4.

As shown in FIG. 2, the valve piston 6 in addition to the second impact surface 28 has a further impact surface 44. Here the further impact surface 44 is formed by a sealing lip 38 of a lip seal 30. The lip seal 30 surrounds the second end section 14 of the valve piston 6 in a ring shape. In further example embodiments, instead of the lip seal a general seal can be formed, for example an O-ring or an X-ring or a ring with any cross-section.

The second impact surface 28 and the further impact surface 44 together form a second attack surface 40, where the forces arising on this second attack surface 40 as a result of the fluid pressure pull the valve piston 6 straight into the second changeover position 8 (cf. FIG. 2).

In order for the switching from the first switching position 7 into the second switching position 8 to take place robustly even with low fluid pressures, it is crucial that the second attack surface 40 is designed very much larger than a first attack surface 39, which for its part generates forces that pull the valve piston 6 into the first switching position 7. This first attack surface 39, which in the example embodiment shown in FIGS. 1 and 2 is designed in the region of the first end section 13 of the valve piston 6 (cf. FIG. 1), is therefore chosen to be more than three times smaller than the second attack surface 40. In further example embodiments the first attack surface 39 is designed more than 1.5 times or more than two times smaller than the second attack surface 40.

FIGS. 6-11 finally show three different applications in which a switchover valve 1 according to the invention can be used advantageously. Here it is envisaged that a switchover valve 1 is set in such a way in a housing 47 of a sanitary assembly 32 that the first flow path 9 is guided through a first fluid outlet 33 of the sanitary assembly 32 and the second flow path 10 through a second fluid outlet 34 of the sanitary assembly 32. In addition, preferably at a greater distance from the switchover valve 1, an outlet valve 35 is located on the second fluid outlet 34, with which a user can clear the second flow path 10.

When the switchover valve 1 is in the first switching position 7, as shown in FIGS. 6, 8 and 10, the fluid, provided there is a fluid pressure at the valve inlet 3 of the switchover valve, can flow through the first valve outlet 4 of the switchover valve 1 and hence out of the first fluid outlet 33 of the assembly 32. During this outflowing, switching forces occur on the first attack surface 39 of the switchover valve 1, which pull the valve piston 6 into the first switching position and hold it there. Thus, in this situation, the valve seal 22 shown in FIG. 1 is open.

Now by opening the outlet valve 35 the second flow path 10 can be cleared, as a result of which the switchover valve 1 is operated remotely. Consequently, there is a strong outflow of fluid from the fluid chamber 18 of the switchover valve 1 through the second valve outlet 5 and along the second flow path until the second fluid outlet 34 of the assembly 32 (cf. FIG. 2 and FIGS. 7, 9 and 11). The switching forces occurring on the second attack surface 40 of the valve piston 6 outweigh the previously mentioned forces arising on the first attack surface 39, with the result that the valve piston 6 is pulled into the second switching position 8.

As a result, the situation shown in FIG. 2 is achieved, in which the valve seal 22 in the region of the first valve outlet 4 is closed and the fluid flows out of the fluid chamber 18 through the flow openings 37 designed in the second impact surface 28 of the valve piston 6 and through the functional element 24 arranged downstream and out of the second valve outlet 5 of the switchover valve 1 along the second flow path 10 until the second fluid outlet 34, as illustrated in FIGS. 7, 9 and 11.

The outlet valve 35 can be designed optionally either as a lever, for example on a handheld shower head, as illustrated in FIGS. 6 to 9, or e.g. as a push-button, as illustrated in FIGS. 10 and 11.

In summary, to improve the switching characteristics of a sanitary switchover valve 1 it is suggested in particular that a valve piston 6 of the switchover valve 1 is designed such that a fluid which flows in through a valve inlet 3 of the switchover valve 1 into a valve body 2 of the switchover valve 1, both in a first switching position 7 and in a second switching position 8 can flow around a connecting element 12, which forms a middle section of the valve piston 6, on all sides (cf. FIG. 5). To this end, it is envisaged that an outer diameter 15 of the connecting element 12 is smaller than an outer diameter 17 of a second end section 14 of the valve piston 6, where the second end section 14 is arranged in the region of a second valve outlet 5 of the valve body 2. Thus, with such a switchover valve 1 the fluid, starting from a first flow path 9, which runs through a first valve outlet 4 of the valve body 2, can be guided by means of the valve piston 6, which is preferably translationally guided inside the valve body 2, along a second flow path 10, which runs through the second valve outlet 5. In the first switching position 7 the valve piston 6 with the valve body 2 can determine the first valve outlet 4. By contrast, in the second switching position 8 the valve piston 6 can completely close the first valve outlet 4. In addition, the valve piston 6 can determine the second valve outlet 5 with the valve body 2. At the same time, the second valve outlet 5 can preferably be at least partially open both in the first switching position 7 and in the second switching position 8.

LIST OF REFERENCE NUMERALS

1 Switchover valve
2 Valve body
3 Valve inlet
4 First valve outlet
5 Second valve outlet
6 Valve piston
7 First switching position
8 Second switching position
9 First flow path
10 Second flow path
11 Section (of 10)
12 Connecting element
13 First end section (of 6)
14 Second end section (of 6)
15 Outer diameter (of 12)
16 Outer diameter (of 13)
17 Outer diameter (of 14)
18 Fluid chamber
19 Outer surface (of 12)
20 First flow cross-sectional area
21 Second flow cross-sectional area
22 Valve seal
23 Receiving space
24 Functional element
25 First transition region
26 Second transition region
27 First impact surface
28 Second impact surface
29 O-ring
30 Lip seal
31 Dead space
32 Assembly
33 First fluid outlet (of 32)
34 Second fluid outlet (of 32)
35 Outlet valve
36 Inner wall (of 2)
37 Flow opening
38 Sealing lip (of 30)
39 First attack surface
40 Second attack surface
41 Sealing surface
42 Retaining ring
43 Retaining piece
44 Impact surface
45 Length (of 12)
46 Inner diameter (of 3)
47 Housing (of 32)
48 Longitudinal axis of 12

The invention claimed is:

1. A sanitary switchover valve (1), comprising:
a valve body (2), which forms a valve inlet (3), a first valve outlet (4) and a second valve outlet (5),
a valve piston (6) in the valve body, the valve piston is movable from a first switching position (7), in which a fluid flowing in through the valve inlet (3) is guided along a first flow path (9) through the first valve outlet (4), into a second switching position (8), in which the fluid is guided along a second flow path (10) through the second valve outlet (5),
a connecting element (12) for the valve piston (6), the connecting element connects a first end section (13) of the valve piston (6) in a region of the first valve outlet (4) to a second end section (14) of the valve piston (6) in a region of the second valve outlet (5),
an outer diameter (15) of the connecting element (12) is smaller than an outer diameter (17) of the second end section (14),
the second end section (14) of the valve piston (6) forms a receiving space (23),
a functional element (24) that is inserted into the receiving space (23), the functional element regulates a fluid flow along the second flow path (10),
the valve piston (6) at a level of a second transition region (26) from the connecting element (12) to the second end section (14) forms a second impact surface (28), and
at least one flow opening (37) is formed in the second impact surface (28), through which the second flow path (10) runs into the receiving space (23).

2. The sanitary switchover valve (1) according to claim 1, wherein the valve piston (6) is switchable by a fluid pressure present at the valve inlet (3) from the first switching position (7) into the second switching position (8), as soon as the second flow path (10) is cleared.

3. The sanitary switchover valve (1) according to claim 1, wherein the first end section (13) in the region of the first valve outlet (4) forms a valve seal (22) with the valve body (2).

4. The sanitary switchover valve (1) according to claim 1, further comprising at least one elastic retaining piece (43) which retains the functional element (24) in the receiving space (23), and
a retaining ring (42) that holds the at least one retaining piece (43) in a position that fixes the functional element (24).

5. The sanitary switchover valve (1) according to claim 1, wherein an outer diameter (15) of the connecting element (12) is smaller than an outer diameter (16) of the first end section (13).

6. The sanitary switchover valve (1) according to claim 1, wherein the connecting element (12) has a rod shape or is a piston shaft or is a rod-shaped piston shaft.

7. The sanitary switchover valve (1) according to claim 1, wherein the valve piston (6) at a level of a first transition region (25) from the connecting element (12) to the first end section (13) forms a first impact surface (27).

8. The sanitary switchover valve (1) according to claim 1, wherein the functional element (24) is arranged in a direction of the second flow path (10) behind the at least one flow opening (37).

9. The sanitary switchover valve (1) according to claim 1, wherein a fluid chamber (18) is formed between the valve body (2) and the connecting element (12), which surrounds the connecting element (12) with a ring shape.

10. The sanitary switchover valve (1) according to claim 9, wherein the fluid chamber (18), starting from the valve inlet (3), becomes narrower toward the first end section (13) and widens toward the second end section (14), such that a second flow cross-sectional area (21) of the fluid chamber (18) in the second transition region (26) is larger than a first flow cross-sectional area (20) of the fluid chamber (18) in a region of the first end section (13).

11. The sanitary switchover valve (1) according to claim 1, wherein a first attack surface (39) of the valve piston (6), which, when a fluid pressure is present at the valve inlet (3), generates surface forces pulling the valve piston (6) toward the first switching position (7), is smaller than a second attack surface (40) of the valve piston (6), which, when a fluid pressure is present at the valve inlet (3), generates surface forces pulling the valve piston (6) toward the second switching position (8).

12. The sanitary switchover valve (1) according to claim 1, wherein a dead space (31) is formed between the valve body (2) and the second end section (14) of the valve piston (6), which a fluid flowing in through the valve inlet (3) is adapted to flow into, but cannot flow through.

13. The sanitary switchover valve (1) according to claim 12, wherein the valve piston (6) produces a further impact surface (44) for the fluid by a seal circulating the valve piston (6), and the valve piston (6) is guided in the valve body (2) by the seal.

14. The sanitary switchover valve (1) according to claim 1, wherein the valve inlet (3) is formed in an outer lateral surface of the body (2) at a level of the connecting element (12).

15. A sanitary switchover assembly (32) comprising:
   a first fluid outlet (33),
   a second fluid outlet (34), and
   a switchover valve (1) according to claim 1,
   wherein the valve body (2) is set in a housing (47) of the assembly (32) in such a way that the first flow path (9) runs through the first fluid outlet (33), while the second flow path (10) runs through the second fluid outlet (34) of the assembly.

16. The sanitary switchover assembly (32) according to claim 15, wherein in a use position the switchover valve (1) is configured to be switchable through a pressure change in the second fluid outlet (34).

\* \* \* \* \*